United States Patent [19]

Schultz

[11] Patent Number: 4,917,163
[45] Date of Patent: Apr. 17, 1990

[54] RAPID TIRE DEFLATION SYSTEM

[75] Inventor: Gary R. Schultz, Kalamazoo, Mich.

[73] Assignee: Eaton Corporation, Cleveland, Ohio

[21] Appl. No.: 339,467

[22] Filed: Apr. 17, 1989

Related U.S. Application Data

[63] Continuation of Ser. No. 142,599, Jan. 11, 1988, abandoned.

[51] Int. Cl.⁴ .............................................. B60C 23/00
[52] U.S. Cl. ..................................... 152/415; 152/427
[58] Field of Search ............... 152/415, 416, 417, 427; 141/197, 95

[56] References Cited

U.S. PATENT DOCUMENTS 3,361,180  1/1968  Neilson et al. .................... 152/415
4,744,399  5/1988  Magnuson et al. ................ 152/417

Primary Examiner—Raymond Hoch
Attorney, Agent, or Firm—P. S. Rulon

[57] ABSTRACT

A central tire deflation system for emergency vehicles, such as fire trucks, rescue vehicles located at airports, enabling the operator to deflate all of the tires of the emergency vehicle to a predetermined minimum pressure while traveling to a crash site so that the "footprint" of the tires is increased at or about the time the vehicle reaches soft terrain. The minimum tire pressure is obtained by controlling the duration of time that the tires are being deflated.

6 Claims, 1 Drawing Sheet

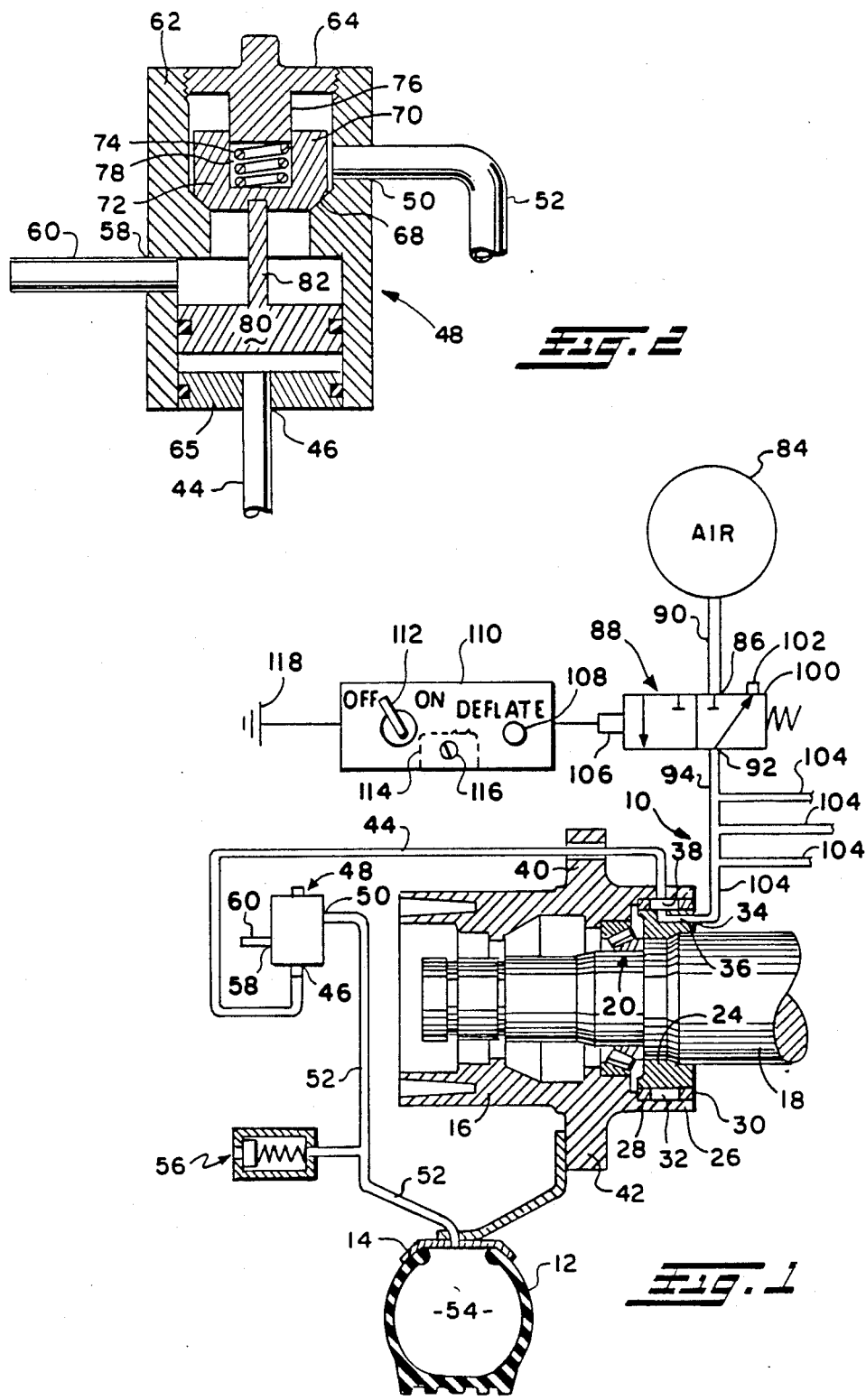

RAPID TIRE DEFLATION SYSTEM

This is a continuation of co-pending application serial no. 07/142,599 filed on Jan. 11, 1988, now abandoned.

This invention relates to a rapid tire deflation system for emergency vehicles such as ambulances, fire trucks, rescue vehicles and the like particularly those existing at airports and used to fight fires and rescue victims of air crashes located on or nearby the airport. Such emergency vehicles must have the capability of traveling as quickly as possible over paved runways, roads and the like and the capability of traveling as quickly as possible over soft terrain such as mud, sand, snow and the like.

It is well known that the traction of vehicles on soft terrain may greatly improve by decreased inflation pressure within the tires and thus increased contact area between the tires and terrain. Central tire inflation/deflation systems are also known, particularly for military vehicles as may be seen by reference to U.S. Pat. Nos. 4,690,331 2,634,781 and 3,361,180, which are hereby incorporated by reference. Such systems are known as central tire inflation systems (CTIS) which allow the operator to remotely, manually and/or automatically vary and/or maintain the inflation pressure of one or more of the vehicle tires utilizing an on board source of pressurized fluid (usually compressed air from the vehicle air brake compressor and/or a compressed air reservoir) and are quite satisfactory for vehicles such as military vehicles which may utilize the CTIS over varying conditions of terrain.

However, these prior art systems are not satisfactory for the aforesaid emergency vehicles since they include an inflation system as well as a deflation system for the tires, are relatively slow in inflating or deflating the tires and are relatively expensive to install and maintain.

U.S. Pat. No. 3,361,180 discloses a tire deflating system for military aircraft, including an electrically actuated tire valve, which will enable the aircraft to take off fully loaded with the tires fully inflated and which will allow the tires to be partially deflated in flight to a predetermined lower pressure to enable the aircraft to land on an unprepared field or sandy desert. The electrically actuated tire valve requires three sets of brushes and commutator rings to energize the tire valve. The system is likewise slow acting, relatively expensive and difficult to maintain.

Accordingly, it is an object of this invention to provide a tire deflation system wherein the pressures in all of the tires of an emergency vehicle may b readily and quickly deflated to a predetermined minimum pressure while nearing the end of a hard surfaced, road or runway so that the "footprint" of the tires is increased at or about the time the vehicle reaches soft terrain to enable the vehicle to reach the site of a crash as quickly as possible.

Another object of the invention is to provide a novel tire deflation system for emergency vehicles whereby a minimum pressure of the deflated tires is obtained by controlling the duration of time that the tires are being deflated.

This and other objects and advantages of the present invention will become apparent from a reading of the following description of the preferred embodiment taken in connection with the attached drawings.

FIG. 1 is a schematic illustration of the pneumatic components of the present invention as utilized to control the deflation of the tires of an emergency vehicle.

FIG. 2 is a sectional view of the normally closed wheel valve.

In accordance with this invention all of the tires 12 of emergency vehicles as described above are deflated substantially, simultaneously and rapidly by the deflation system 10 shown in FIG. 1. The inflatable tires 12 are each mounted on a tire rim 14 which is fixed to a wheel hub assembly 16 rotatably supported on the outer end of an axle housing 18 by means of bearings 20. An annular sleeve 24 is pressed fitted to the axle at a location inboard of the bearings 20. The wheel hub is provided with an inwardly extending sleeve type annular flange 26 telescopically surrounding sleeve 24. A pair of rotary seals 28 and 30 extend radially between the outer periphery of sleeve 24 and the inner periphery of sleeve type flange 26 to define an annular seal chamber 32 therebetween, as may be seen in greater detail by reference to U.S. Pat. No. 4,434,834, assigned to the assignee of this invention. Sleeve 24 is provided with an inlet 34 and a passage 36 opening to the chamber 32. The sleeve type flange 26 is provided with a generally radially extending passage 38 extending from the sealed chamber 32 to the exterior outer diameter surface thereof. A single passage 40 may be provided in the radial flange portion 42 of the wheel hub 16 for passage of a pressure conduit 44.

The pressure conduit 44 is connected to the inlet 46 of the tire control valve 48 mounted on the wheel hub 16. The valve 48 has a port 50 connected by a pressure conduit 52 to the interior chamber 54 of the tire 12. A manual inflate and check valve 56 may be connected to the conduit 52 or directly through the rim 14 to the tire chamber 54.

As may be seen by reference to FIG. 2, the wheel valve 48 is an air actuated normally closed valve. The valve 48 defines three ports, port 50 connected by conduit 52 to the tire chamber 54, port 46 connected to the sealed chamber 32 and port 58 connected to the exhaust conduit 60 which is vented to atmosphere. Valve 48 includes a tubular body 62 sealed by end plugs 64 and 65. An annular valve seat 68 is positioned between the ports 50 and 58. A valve member 70 having a valve seat 72 is urged by compression spring 74 into sealing engagement against the seat 68. The plug 64 includes a projection 76 partially extending into a blind hole in the valve member 70 forming a cavity 78 to retain the spring 74. Accordingly, the valve 48 is normally held in closed position to prevent air from escaping from the conduit 52 to the exhaust conduit 60.

The valve 48 is opened by pressurized air entering port 46 to actuate the piston 80 to thereby move the piston and the projection 82 toward the valve member 70 so that the valve seat 72 thereof is moved off of the valve seat 68 against the bias of spring 74. The valve seats 72 and 68 are thus unsealed and moved apart far enough to permit free flow and rapid exhaust of air from the tire 12 to the conduit 60. While the structure of valve 48 has been described with a certain degree of detail, it is understood that air actuated valves performing the same function, but of different construction, may be substituted therefor.

Each of the wheel assemblies 16 of the emergency vehicle is provided with a wheel valve 48 each supplied with actuating pressurized air from a common source 84 which is typically a pressurized air reservoir supplied by a compressor. The pressurizing air source 84 is connected to inlet 86 of a dual shut-off and exhaust valve 88 by a conduit 90. The outlet 92 of valve 88 is connected to a manifold 94 and is normally connected to the port 100 of the exhaust conduit 102. A plurality of conduits 104 connect the manifold 94 to each of the inlets 34, sealed chamber 32, conduits 44 and hence to the wheel valves 48 on each wheel of the vehicle.

The shut-off and exhaust valve 88 has a first or normal position, as shown in FIG. 1, blocking the flow of air between the inlet 86 and outlet 92 thereof, and a second or open position permitting air flow between the inlet 86 and outlet 92 thereof. The valve 88 is electrically operated and preferably a solenoid controlled valve of conventional design spring biased to the normal position shown in FIG. 1. In the normal closed position outlet 100 is open to exhaust air to the exhaust 102 from the manifold 94 and the air circuit to each wheel valve 48.

The solenoid 106 of the valve 88 is connected to a "deflate" push button switch 108 mounted on the control panel 110 located in the cab of the vehicle. An on/off switch 112 and a timer 114 with a screw operated adjusting means 116 are also mounted on the control panel 110 and connected to a battery 118. The timer adjusting means 116 is initially manually adjusted so that the timer clock therein is set to run for a predetermined period of time necessary to deflate the tires 12 from a normal over the road operating pressure of, for example 60 psi, to a lower pressure, for example 20 psi, for operation over soft terrain such as mud, sand, snow or the like. The duration of time that the timer clock is set to run depends on the initial tire pressure, the tire size and the size of the passages and ports in the conduit 52 and wheel valve 48 mounted on each wheel 16. Generally, the timer adjusting means 116 is manually set so that the timer 114 operates for a duration of between a few seconds and 30 seconds corresponding to the time necessary to lower the tire pressure from its normal operating pressure to a minimum pressure for most efficiently operating over soft terrain.

Assuming that an emergency vehicle, equipped with the tire deflation system of this invention, is stationed at an airport and an air crash occurs nearby in soft terrain some distance from the end of the runway. The vehicle can travel at top speed down the runway with the tires inflated at normal pressure. As the vehicle approaches the end of the runway the operator turns the switch 112 to the "on" position. As the vehicle approaches soft terrain, the operator pushes the "deflate" push button 108 energizing the solenoid 106 of the valve 88 and starts the timer 114. The solenoid 106 moves the valve 88 to open the inlet 86 and outlet 92 so that pressurized air from the air source 84 flows into the manifold 94 and the air circuit to open the normally closed wheel valves 48. At the same time, the outlet port 100 of the solenoid valve 88 is closed. The wheel valves 48 are all kept open so long as the air circuit to the valves 48 is pressurized. After the timer 114 has operated for the predetermined period of time, the solenoid 106 of the solenoid valve is deenergized and the valve 88 is moved to its normal deactivated position shown in FIG. 1. The air circuit to the wheel valve 48 is depressurized and each of the wheel valves move to the closed position shown in FIG. 2 with the pressure of each tire lowered to a predetermined minimum pressure for traveling over soft terrain which occurs at or about the same time the vehicle reaches soft terrain.

Accordingly, this invention provides a tire deflation system for rapidly deflating all of the tires of an emergency vehicle which is operator initiated by simply pushing the push button switch 108 as the vehicle approaches soft terrain so that all of the tires are deflated for a predetermined period of time to enable the vehicle to proceed over soft terrain with a larger tire "footprint" and increased traction so that the vehicle can proceed to the site of a crash, or the like, as quickly as possible.

I claim:

1. A rapid tire deflation system for emergency vehicle tires comprising;

a plurality of wheels each provided with a pressurized tire;

an air actuated two position wheel valve mounted on each wheel which is normally closed and when opened, exhausts the pressurized air in said tire to atmosphere;

an air circuit for actuating said wheel valves including conduits for communicating air between each wheel valve and a single solenoid valve connecting said air circuit to a source of pressurized air on said vehicle;

said solenoid valve mounted on said vehicle and energized by a manually activated switch which when actuated energizes said solenoid valve to pressurize said air circuit to open said wheel valves to deflate said tires; and an electrical control circuit and timer means for controlling the duration of time said solenoid valve is energized and said duration of time said solenoid valve is energized being the duration of time said wheel valves are opened so that said tires are depressurized to a predetermined lower pressure.

2. A rapid tire deflation system for emergency vehicle tires as claimed in claim 1 in which said control circuit maintains said solenoid valve in open position for a predetermined time until said tires have been depressurized to the predetermined lower pressure.

3. A rapid tire deflation system for emergency vehicle tires as claimed in claim 1 in which said control circuit includes a manually actuated normally open switch.

4. A rapid tire deflation system for emergency vehicle tires as claimed in claim 3 in which said control circuit includes a push button for initiating the energization of said timer and solenoid valve.

5. An emergency deflation system for vehicle tires as claimed in claim 1 in which said timer is manually adjustable to increase or decrease the duration of time said solenoid valve is energized, thereby controlling the lower pressure to which the tires are deflated.

6. A rapid tire deflation system for emergency vehicle tires as claimed in claim 1 in which said solenoid valve is operative when de-energized to directly exhaust the pressurized air in the conduits between the solenoid valve and the wheel valves.

* * * * *